United States Patent
Ertl et al.

(10) Patent No.: US 7,227,626 B2
(45) Date of Patent: Jun. 5, 2007

(54) METHOD FOR DETERMINING THE CURRENT POSITION OF THE HEADS OF VEHICLE OCCUPANTS

(75) Inventors: Ludwig Ertl, Regensburg (DE); Thorsten Köhler, Deuerling (DE)

(73) Assignee: Siemens Aktiengesellschaft, Munich (DE)

( * ) Notice: Subject to any disclaimer, the term of this patent is extended or adjusted under 35 U.S.C. 154(b) by 110 days.

(21) Appl. No.: 10/532,151

(22) PCT Filed: Apr. 1, 2004

(86) PCT No.: PCT/EP2004/050411

§ 371 (c)(1),
(2), (4) Date: Apr. 20, 2005

(87) PCT Pub. No.: WO2004/101325

PCT Pub. Date: Nov. 25, 2004

(65) Prior Publication Data

US 2006/0023918 A1 Feb. 2, 2006

(30) Foreign Application Priority Data

May 13, 2003 (DE) .................... 103 21 506

(51) Int. Cl.
*G01B 11/26* (2006.01)
(52) U.S. Cl. .................... 356/139.03; 356/139.01; 356/139.02
(58) Field of Classification Search ............ 356/139.03
See application file for complete search history.

(56) References Cited

U.S. PATENT DOCUMENTS

| 6,094,610 | A | 7/2000 | Steffens, Jr. et al. |
| 2003/0001368 | A1* | 1/2003 | Breed et al. ............... 280/735 |
| 2003/0079929 | A1 | 5/2003 | Takagi et al. |
| 2003/0081814 | A1 | 5/2003 | Takagi et al. |
| 2003/0116698 | A1 | 6/2003 | Hayashi et al. |
| 2005/0031166 | A1* | 2/2005 | Fujimura et al. ........... 382/103 |

FOREIGN PATENT DOCUMENTS

DE  40 23 109 A1  1/1992

(Continued)

*Primary Examiner*—Thomas H. Tarcza
*Assistant Examiner*—Luke Ratcliffe
(74) *Attorney, Agent, or Firm*—Laurence A. Greenberg; Werner H. Stemer; Ralph E. Locher (57) ABSTRACT

The invention relates to a method for determining the current position (A, B, C, D) of a head (9) of an occupant (8) in the passenger compartment (2) of a motor vehicle (1), said head moving toward an automatic dynamic disabling zone (6) in front of an airbag module (5). To this end, the invention makes use of the idea that the best position for a measurement with regard thereto is the point in space where the ideal direction of movement (14) of the head (9) is perpendicular to an ideal line of sight (17) of the camera (160. The measurement is then preferably carried out when the geometric center (10) of the head (9) crosses this point. In a preferred embodiment, the calculation of the actual movement vector of the head (9) is taken as a basis, said head being preferably perpendicular in a current line of sight (18) of the camera (16). The invention advantageously increases the potential for protecting an occupant (8) in a motor vehicle (1). It is thus suited, in particular, for use in occupant protection systems of modern motor vehicles (1).

32 Claims, 4 Drawing Sheets

FOREIGN PATENT DOCUMENTS

| | | |
|---|---|---|
| DE | 197 52 145 A1 | 5/1999 |
| DE | 199 11 688 A1 | 1/2000 |
| DE | 199 06 418 A1 | 8/2000 |
| DE | 199 26 845 A1 | 10/2000 |
| DE | 199 32 520 A1 | 2/2001 |
| DE | 102 32 162 A1 | 7/2003 |
| EP | 1 069 001 A1 | 1/2001 |
| EP | 1 278 159 A2 | 1/2003 |

* cited by examiner

METHOD FOR DETERMINING THE CURRENT POSITION OF THE HEADS OF VEHICLE OCCUPANTS

BACKGROUND OF THE INVENTION

Field of the Invention

The present invention relates to a method for determining the current position (A, B, C, D . . . ) of a head of an occupant in the passenger compartment of a motor vehicle, said head moving toward a dynamic disabling zone in front of an air bag module.

Future restraint systems in motor vehicles will have to take into account the current position of the heads of vehicle occupants, in order to achieve the optimum protective effect during airbag activation. These developments are also driven by legislative initiatives, for example in the US by legislative initiative FMVSS 208.

A important element of such legislation is the automatic dynamic disabling zone in front of the airbag module (hereafter referred to as the critical out of position zone or COOP. The limit of this zone is typically located at a distance of around 10 cm from the airbag module toward the occupant. If during an accident (e.g. as a result of total brake application) the head of the vehicle occupant is thrown toward the airbag module, the legislation requires the airbag to be disabled before the head or torso enters the COOP zone. A critical factor here is the distance from the part of the head (generally the face) or torso (generally the chest) facing the airbag to the airbag module.

An important criterion for optimizing this function is the size of the so-called switch zone. On the one hand the airbag must be deactivated before the head enters the COOP zone but on the other hand the occupant must not be denied any protection potential at an adequate distance from the airbag. The switch zone should therefore be as small as possible. The size of the switch zone is typically around a few centimeters.

Contactless systems and primarily optical systems have been developed to measure the distance of the head of the occupant from the airbag module. These optical systems are preferably 3D cameras, which operate according to the stereoscopic method, the pencil of light method or TOF (time of flight).

Such image acquisition units are typically integrated up in the roof module between the vehicle seats (see FIGS. 1 and 2 below). The advantage of this integration position is that under normal circumstances the camera cannot easily be covered, e.g. by occupants reading newspapers. One disadvantage is however that when the head enters the COOP zone, the camera cannot see the part of the head facing the airbag module, i.e. generally the face. In this instance the image acquisition unit is looking at the back of the occupant's head.

It is known that this problem can be resolved by assuming a mean head size. However this assumption is subject to not insignificant error in the case of bouffant hairstyles, head coverings, etc. The assumption no longer applies in such cases. The switch zone must therefore be big enough to cover most scenarios given this uncertainty.

Figure 3:
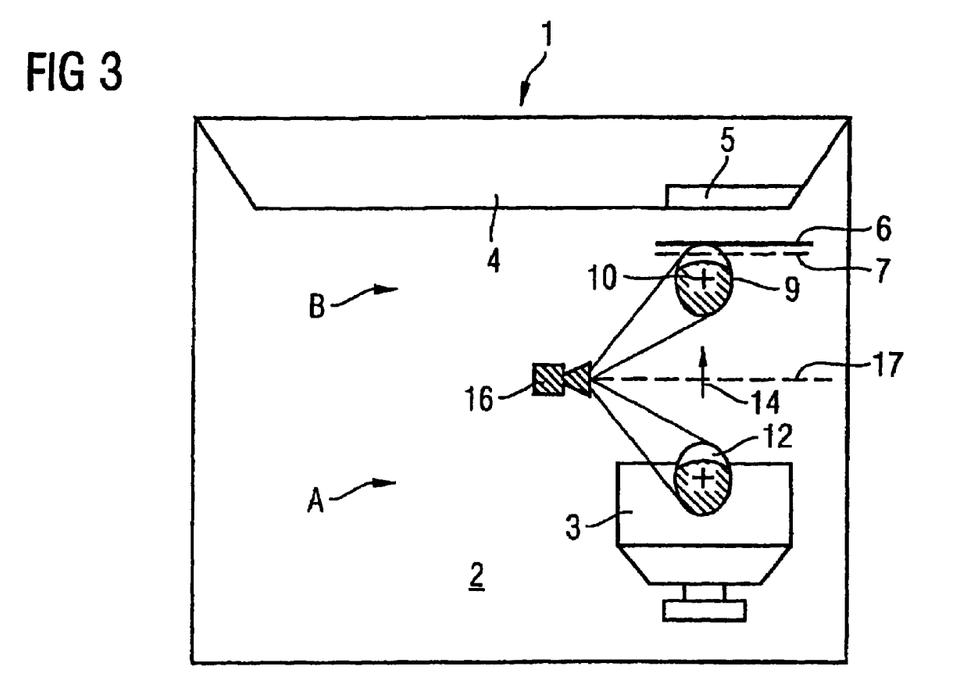
FIG. 3 shows a schematic diagram of the measurement of the head positions of an occupant assuming mean head sizes.

FIG. 3 illustrates this situation. In head position A (seated normally) the camera sees the face of the occupant but not the hair. In head position B (face at limit of COOP zone) the camera looks at the back of the occupant's head and sees the hair but no longer the face of the occupant.

Figure 4:
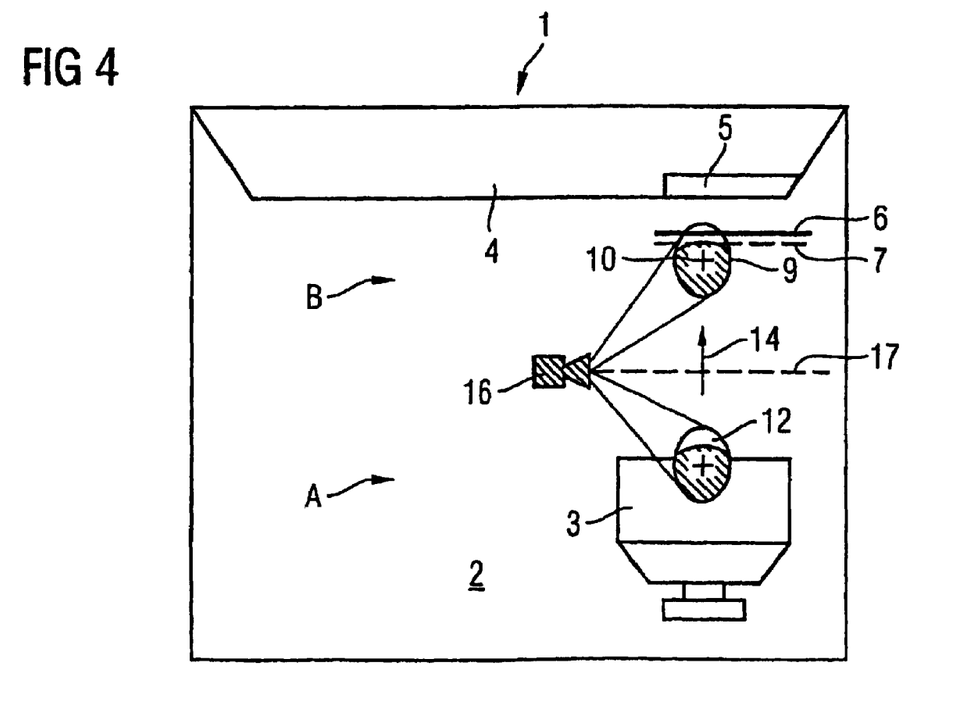
FIG. 4 shows a schematic diagram of the incorrect measurement based on the assumption according to FIG. 3 of the head positions of an occupant with a bouffant hairstyle for example.

FIG. 4 shows that if a mean head size is assumed, even a slightly bouffant hairstyle can result in the camera determining a position outside the COOP even though the head has already entered the COOP.

SUMMARY OF THE INVENTION

The object of the invention is to specify an improved method, which avoids the above disadvantages, and a device for the exact determination of the position of the heads of vehicle occupants. In particular the invention should allow the smallest possible switch zone to be achieved, so as not to deny the occupant any protection potential at an adequate distance from the airbag module.

This object is achieved by the independent claims. Advantageous embodiments and developments, which can be deployed individually or in combination with each other, are set out in the dependent claims.

A first method according to the invention for determining the exact position (A, B, C, D . . . ) of a head of an occupant in the passenger compartment of a motor vehicle, said head moving toward an automatic dynamic disabling zone in front of an airbag module, using an image acquisition unit with an ideal line of sight, which is essentially perpendicular to the ideal direction of movement of the occupant, is characterized in that the image acquisition unit is used at least cyclically to record an image scenario including the occupant, i.e. an image area including the occupant, in the passenger compartment of the motor vehicle and to detect image information relating to the occupant; in the respective current scenario image both the position of the geometric center of the head and the apparent size of the head are determined, in particular measured in the direction of movement; the respective current lines of sight of the image acquisition unit are defined as a vector from a defined position of the image acquisition unit to the respective current position of the geometric center of the head; the respective current angle α between the ideal line of sight and the current lines of sight of the image acquisition unit are calculated; the respective current values for angle α and apparent size of the head are stored in a storage unit; and the value from the storage unit for which the absolute sum of the difference between angle α and 0° was minimal is always assumed to be the size of the head.

Contrary to the prior art therefore instead of a mean head size, an apparent and therefore ultimately real head size is determined. Then during the for example parallel position calculations the head sizes, which are closest to the actual head size and in the best instance may even correspond to it, are selected from the set of head sizes thus determined and used as the basis for calculation. Using a head size based on reality for determination of the current position in front of the airbag module advantageously gives a much more exact position determination than is possible with the prior art and therefore allows a significantly smaller switch zone to be achieved, thereby increasing the protection potential for the occupant of the vehicle.

The present invention also relates to a method for determining the exact position (A, B, C, D . . . ) of a head of an occupant in the passenger compartment of a motor vehicle, said head moving toward an automatic dynamic disabling zone in front of an airbag module, using an image acquisition unit with an ideal line of sight, which is essentially perpendicular to the ideal direction of movement of the occupant, the image acquisition unit being used at least cyclically to record an image scenario including the occupant, i.e. an image area including the occupant, in the passenger compartment of the motor vehicle and to detect image information relating to the occupant; both the position of the geometric center of the head and the apparent size of the head being measured in the direction of movement in the respective current scenario image; the respective current lines of sight of the image acquisition unit being defined as a vector, from a defined position of the image acquisition unit to the respective current position of the geometric center of the head; the respective current angles β between the direction of movement of the head and the current lines of sight of the image acquisition unit being calculated; the respective current values for angle β and the apparent size of the head being stored in a storage unit; and the value from the storage unit for which the absolute sum of the difference between angle β and 90° was minimal being assumed to be the size of the head. This method also has the advantages mentioned above.

In a preferred embodiment of the invention the image acquisition unit is a 3D camera, which operates according to the stereoscopic method, the pencil of light method, the time of flight method or another equally appropriate method. Use of a 3D camera, in particular in respect of the last mentioned method according to the invention, advantageously allows determination of the current position independently of ideal movement directions and/or lines of sight based on actual movement vectors in three-dimensional space.

Instead of carrying out a position determination based on an ideal direction of movement, it is therefore preferably proposed according to the invention that the respective current angle β is calculated between a current actual movement vector of the head and the current line of sight vector of the image acquisition unit. This advantageously enhances the reliability of the method according to the invention even when an occupant is sitting with a lateral orientation, as for example occurs normally when looking out of a side window, etc.

Because the respective last or previous value for the position of the geometric center of the head is preferably stored, the respective current movement vector can advantageously be calculated in a simple manner from the stored last and the current 3-dimensional positions of the head.

According to the invention the defined position of the image acquisition unit is preferably based on the center of a lens aperture of the image acquisition unit, in the case of the stereo camera for example the left lens.

In a further preferred embodiment of the invention, the image acquisition unit records images of the relevant scene continuously, at least 25 images per second, in particular at least 30 images per second, preferably at least 35 images per second, so that film speeds, i.e. online viewing, can actually advantageously be achieved.

The size of the storage unit is such that at least all the measured values of a slow head movement from a first head position (A), i.e. an initial position, to the relevant second head position (B), namely the position with the face at the limit of the COOP area, can be stored.

In one expedient embodiment of the invention the storage unit is a ring buffer store, which is first filled and from then on the oldest value is replaced by the current value.

It has also proven advantageous for the recordings of the head movement to be filtered using filters such as Kalman filters and/or movement models.

It should be noted specifically that instead of determining the head position, with the image acquisition unit any other appropriate part of the body of an occupant can be used as the basis for calculating the position of said occupant, such as in particular the size of the torso of the occupant in the motor vehicle.

In a further preferred embodiment of the invention it is proposed that different views of the occupant be combined to provide a 3D overall view of the person. This advantageously allows simulation for example of the front or facial profile of the occupant in front of the plane of the COOP limit from the overall view and therefore more accurate calculation of its distance from the disabling zone or the airbag module than with the prior art.

For the sake of completeness, it should be pointed out that the invention also of course relates to a device corresponding to the method for determining the current position (A, B, C, D . . . ) of a head of an occupant in the passenger compartment of a motor vehicle, said head moving toward an automatic dynamic disabling zone in front of an air bag module, said device being characterized by appropriate means for carrying out the method as described above.

Particular problems relating to the legislative initiative FMVSS 208 mentioned above are known to be posed by the validatability and reproducibility of the head position measurements in the context of the licensing procedure for a camera system. By improving the head position determination even by a matter of centimeters, the present invention can offer crucial advantages both here and in the field. By advantageously enhancing the protection potential of an occupant in a motor vehicle thus, the present invention is in particular suitable for occupant protection systems in modern motor vehicles.

BRIEF DESCRIPTION OF THE DRAWING

The invention is described below with reference to different exemplary embodiments and in conjunction with the drawing, in which.

DESCRIPTION OF THE PREFERRED EMBODIMENTS

Figure 1:
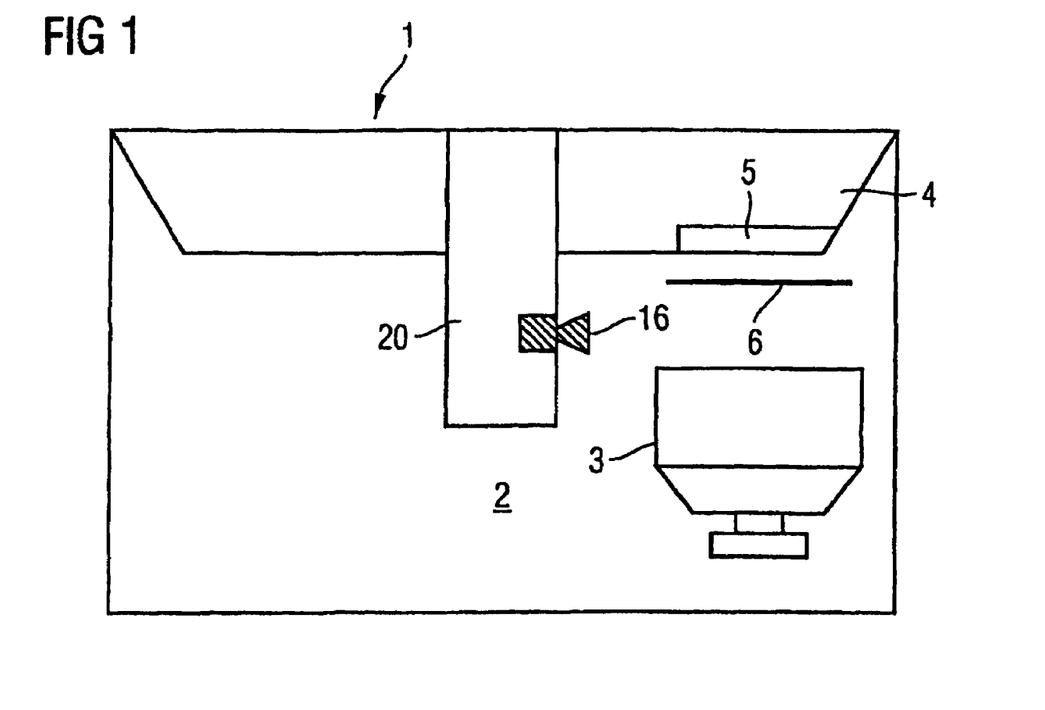
FIG. 1 shows a schematic diagram of a top view of a typical integration location for an image acquisition unit in the passenger compartment of a motor vehicle.

FIG. 1 shows a top view of the typical integration location of an image acquisition unit 16 in the passenger compartment 2 of a motor vehicle 1.

Figure 2:
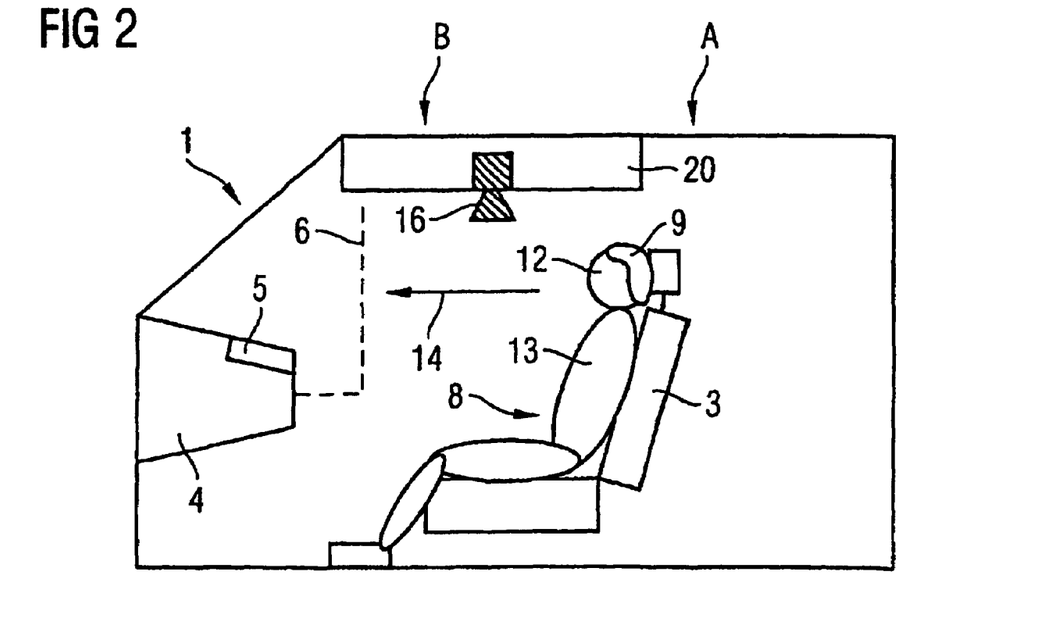
FIG. 2 shows a schematic diagram of a side view of the integration location according to FIG. 1.

FIG. 2 shows a side view of the diagram in FIG. 1.

An image acquisition unit 16, for example a 3D camera, is generally integrated in a module up in the roof liner 20 between the vehicle seats 3. An airbag module 5 is housed in front of the seats 3, typically in the dashboard 4. An automatic dynamic COOP disabling zone 6 in front of the airbag 5 serves for the statutorily required protection of an occupant 8 from injury by the airbag 5, if a minimum distance therefrom is not observed. The advantage of the integration location 20 described above for the camera 16 is that under normal circumstances it cannot easily be covered, for example by occupants 8 reading newspapers. It is however a disadvantage that when the head 9 enters the COOP zone 6, the camera 16 cannot see the part of the head 9 facing the airbag module 5, generally the face 12. In this instance the camera 16 is looking at the back of the head of the occupant 9.

It is known that this problem can be resolved by assuming a mean head size. This assumption is however subject to not insignificant error in the case of bouffant hairstyles, head coverings, etc. The assumption no longer applies in such cases. A switch zone 7 in front of the COOP zone must therefore be big enough to cover most scenarios given this uncertainty.

FIG. 3 illustrates this situation, i.e. the measurement of head positions of an occupant 8 assuming mean head sizes. In head position A (seated normally) the camera 16 sees the face 12 of the occupant but not the hair. In head position B (face at limit of COOP zone) the camera 16 looks at the back of the head of the occupant 8 and sees the hair but no longer the face 12 of the occupant 8.

FIG. 4 shows the incorrect measurement based on the assumption according to FIG. 3. If a mean head size is assumed, even a slightly bouffant hairstyle can result in the head 9 entering the COOP zone 6 but the camera still determining a position outside the COOP zone 6.

Figure 5:
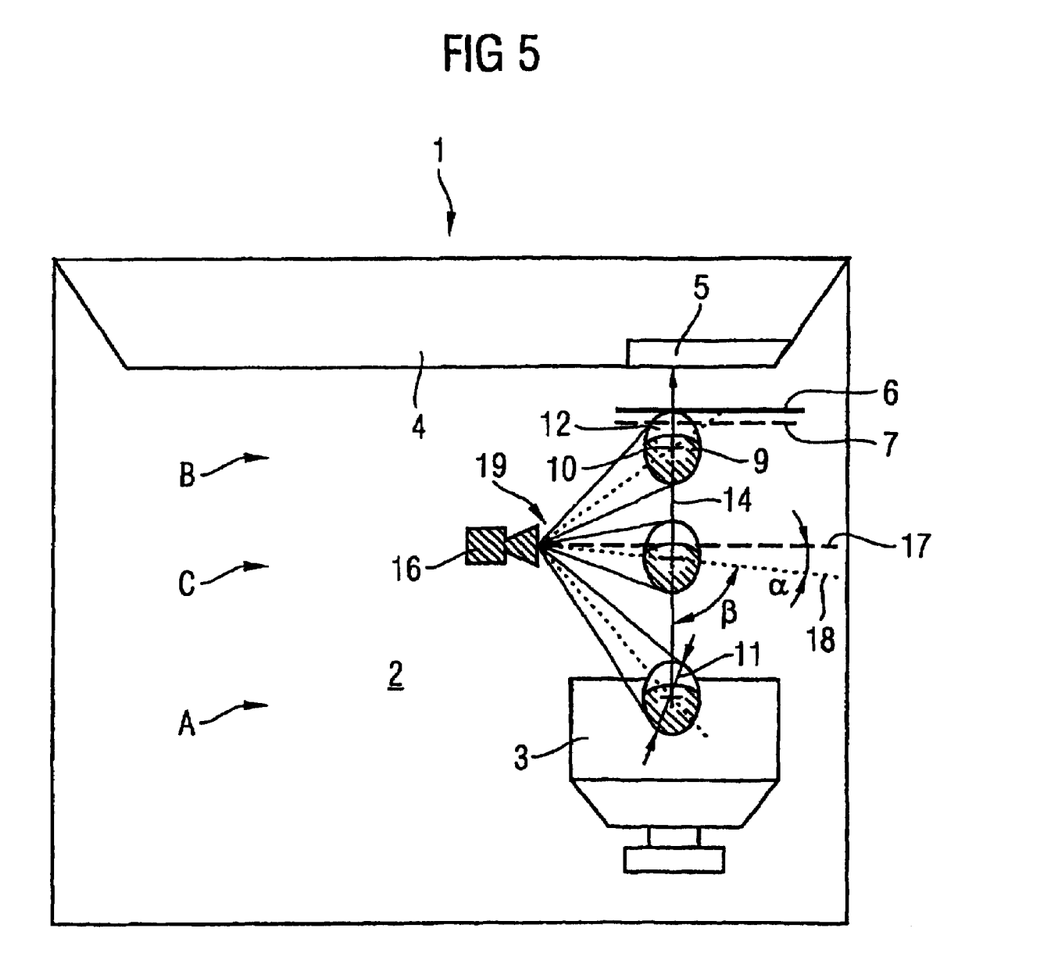
FIG. 5 shows a schematic diagram of a first exemplary embodiment of the measurement of head positions according to the invention.

FIG. 5 shows a first exemplary embodiment of the measurement of head positions according to the invention in principle. To this end the size 11 of the head 9 of the occupant 8 is determined or measured as accurately as possible, particularly at head position C. The invention hereby utilizes the idea that the best position for a measurement with regard thereto is the point in space, at which the ideal direction of movement 14 of the head 9 is perpendicular to an ideal line of sight 17 of the camera 16. The measurement is then preferably carried out when the geometric center 10 of the head 9 crosses this point.

A method for determining the current size 11 of the head 9 for example implemented in an algorithm can for example be as follows:

Known methods of image processing are used in the respective current 3D image to measure the position of the geometric center 10 of the head 9, as well as the apparent size 11 of the head 9 in the direction of movement 14.

The current line of sight 18 of the camera 16 is defined as a vector, from a defined camera position 19, for example the center of the lens aperture, in the case of a stereo camera 16 for example the left lens, to the position of the geometric center 10 of the head 9.

A current angle $\alpha$ between the ideal line of sight 17 and the current lines of sight 18 of the 3D camera 16 is then calculated according to known methods of linear algebra. Alternatively or even cumulatively as a plausibility check for example, a current angle $\beta$ can be calculated between the ideal direction of movement 14 of the head 9 and the current lines of sight 18 of the image acquisition unit 16.

The respective current values for angles $\alpha$ and $\beta$ and apparent head size 11 are then stored, preferably in a ring buffer store (not shown), in which the oldest value is always replaced by the current value. The size of the ring buffer store is preferably dimensioned such that at least all the measured values of a slow head movement 14 from head position A to head position B can be stored.

The value from the current ring buffer store for which the absolute sum of the difference between angle $\alpha$ and 0° or angle $\beta$ and 90° was minimal is always assumed to be the size of the head.

Figure 6:
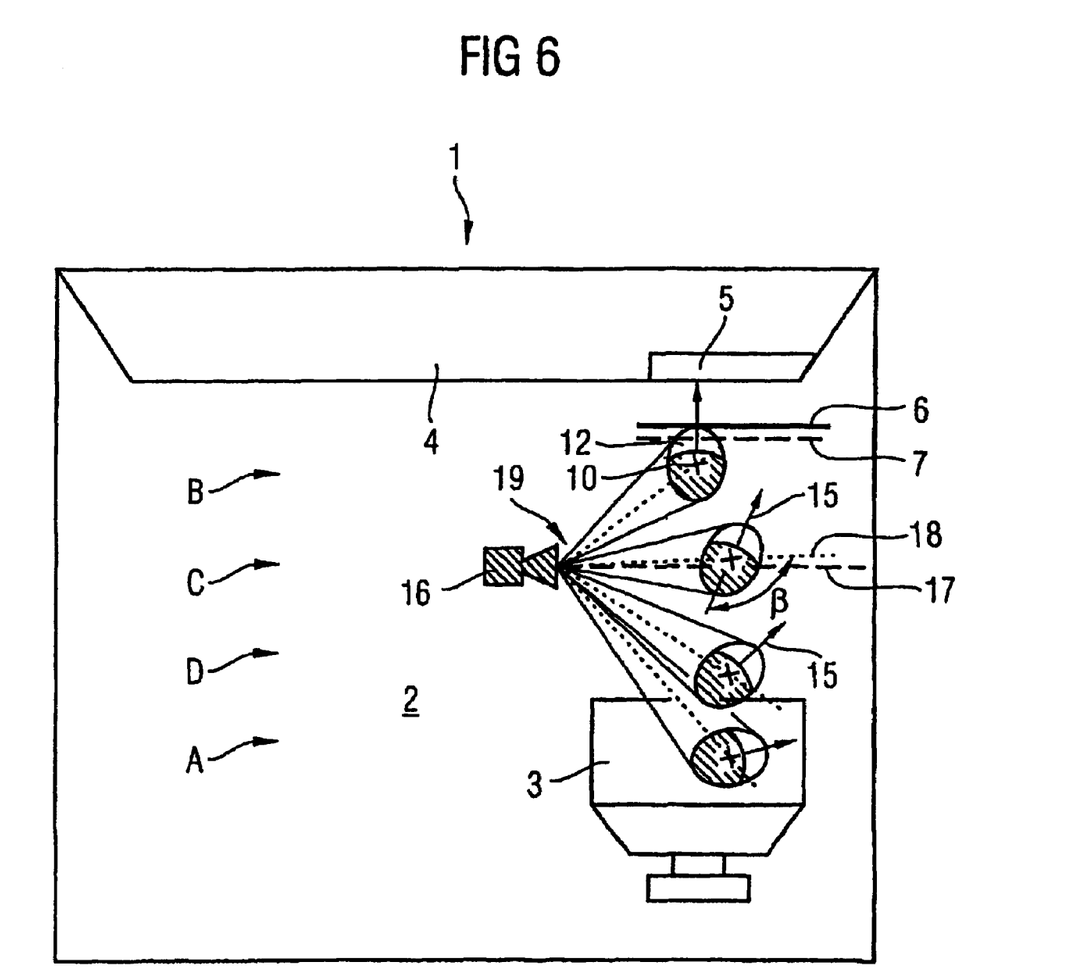
FIG. 6 shows a schematic diagram of a second exemplary embodiment of the measurement of head positions according to the invention.

FIG. 6 shows a second exemplary embodiment of a preferred measurement of head positions according to the invention.

First known image processing methods are used in the respective current 3D image to measure the position of the geometric center 10 of the head 9, as well as the apparent size 11 of the head 9 in the direction of movement 14.

The current line of sight 18 of the camera 16 is also defined as a vector, from a defined camera position 19, for example the center of the lens aperture, in the case of a stereo camera 16 for example the left lens, to the position of the geometric center 10 of the head 9.

Unlike in FIG. 5, the respective last, i.e. previous, values are now stored for the position 10, so that an actual movement vector 15 of the head 9 can be calculated from the stored last and current 3-dimensional head position 10.

The current angle $\beta$ between the actual movement vector 15 of the head 9 and the current lines of sight 18 of the 3D camera 16 are then calculated according to known methods of linear algebra.

The respective current values for angle $\beta$ and apparent head size 11 are then stored, again preferably in a ring buffer store (not shown), in which the oldest value is always replaced by the current value.

The value from the current ring buffer store for which the absolute sum of the difference between angle $\beta$ and 90° was minimal, i.e. the geometry was closest to the "perpendicular" condition, is always assumed to be the size of the head.

It should be noted that the methods described above can be stabilized further by further measures. For example the head movement 14 or 15 can be filtered using known filters and movement models (Kalman filters).

The above methods can also advantageously be applied correspondingly to the determination of the distance of the torso 13 of the occupant from the airbag module 5. The size of the torso 13 of the occupant 8 is then detected using the 3D camera instead of the size 11 of the head 9.

The above methods can be developed still further by combining the different views of the person 8, which result from the different positions A, B, C, . . . of the person 8 in relation to the camera 16, to form a three-dimensional overall view of the person 8, e.g. front view A with person sitting normally plus side view C with person 8 next to camera 16 plus rear view B with person 8 bending.

All partial views A, B, C, D, . . . , recorded during the forward movement of the person 8 by the 3D camera 16 and buffered in the ring buffer store, can also be used for the combination of partial views A, B, C, . . . of the person 8.

When the person 8 is close to the COOP zone 6, practically only the rear of the person is visible to the 3D camera 16. The non-visible front 12 of the person 8 can now be simulated from the overall view determined above and the distance from the airbag module 5 can be calculated more accurately.

The present invention advantageously enhances the protection potential of an occupant 8 in a motor vehicle 1. It is therefore suitable in particular for occupant protection systems in modern motor vehicles 1.

We claim:

1. A method for determining a current position of a head of an occupant in a passenger compartment of a motor vehicle, the head moving toward an automatic dynamic disabling zone in front of an airbag module, which comprises the steps of:
   providing an image acquisition unit having an ideal line of sight being substantially perpendicular to an ideal direction of movement of the occupant;
   recording an image scenario in the passenger compartment of the motor vehicle containing the occupant at least cyclically with the image acquisition unit and image information relating to the occupant being detected;
   determining both a position of a geometric center of the head and an apparent size of the head in the ideal direction of movement in a respective current scenario image;
   defining current lines of sight of the image acquisition unit as a vector, from a defined position of the image acquisition unit to a respective current position of the geometric center of the head;
   calculating respective current angles values between the ideal line of sight and the current lines of sight of the image acquisition unit;
   storing the respective current angles values and the apparent size of the head in a storage unit; and
   using the apparent size of the head stored in the storage unit at which an absolute sum of a difference between the respective current angle values and 0° was minimal to be an actual size of the head.

2. The method according to claim 1, which further comprises using a 3D camera as the image acquisition unit, the 3D camera operating according to a method selected from the group consisting of a stereoscopic method, a pencil of light method, and a time of flight method.

3. The method according to claim 1, which further comprises basing the defined position of the image acquisition unit on a center of a lens aperture of the image acquisition unit.

4. The method according to claim 3, which further comprises using a stereo camera as the image acquisition unit and basing the defined position on a center of a left lens aperture of the stereo camera.

5. The method according to claim 1, which further comprises recording continuously, via the image acquisition unit, images of a relevant scenario, at least 25 images per second.

6. The method according to claim 1, which further comprises dimensioning a size of the storage unit such that at least all measured values of a slow head movement from a first head position to a second head position can be stored.

7. The method according to claim 1, which further comprises using a ring buffer store as the storage unit, the ring buffer store being first filled and from then on an oldest value is always replaced by a current value.

8. The method according to claim 1, which further comprises filtering recordings of a head movement by filters and/or movement models.

9. The method according to claim 1, which further comprises combining different views of the occupant for forming a 3D overall view of the occupant.

10. The method according to claim 9, which further comprises:
   simulating a front of the occupant for the 3D overall view; and
   calculating a distance between the automatic dynamic disabling zone or the airbag module and the front of the occupant.

11. The method according to claim 1, which further comprises recording continuously, via the image acquisition unit, images of a relevant scenario, at least 30 images per second.

12. The method according to claim 1, which further comprises recording continuously, via the image acquisition unit, images of a relevant scenario, at least 35 images per second.

13. The method according to claim 10, which further comprises simulating a facial profile of the occupant.

14. A method for determining a current position of a body part of an occupant in a passenger compartment of a motor vehicle, the body part moving toward an automatic dynamic disabling zone in front of an airbag module, which comprises the steps of:
   providing an image acquisition unit having an ideal line of sight being substantially perpendicular to an ideal direction of movement of the occupant;
   recording an image scenario in the passenger compartment of the motor vehicle containing the occupant at least cyclically with the image acquisition unit and image information relating to the occupant being detected;
   determining both a position of a geometric center of the body part and an apparent size of the body part in the ideal direction of movement in a respective current scenario image;
   defining current lines of sight of the image acquisition unit as a vector, from a defined position of the image acquisition unit to a respective current position of the geometric center of the body part;
   calculating respective current angles values between the ideal line of sight and the current lines of sight of the image acquisition unit;
   storing the respective current angles values and the apparent size of the body part in a storage unit;
   using the apparent size of the body part stored in the storage unit at which an absolute sum of a difference between the respective current angle values and 0° was minimal to be an actual size of the body part.

15. The method according to claim 14, which further comprises determining a size of a torso as the body part.

16. A method for determining a current position of a head of an occupant in a passenger compartment of a motor vehicle, the head moving toward an automatic dynamic disabling zone in front of an airbag module, which comprises the steps of:
   providing an image acquisition unit having an ideal line of sight being substantially perpendicular to an ideal direction of movement of the occupant;
   recording an image scenario in the passenger compartment of the motor vehicle containing the occupant at least cyclically with the image acquisition unit and image information relating to the occupant being detected;
   determining both a position of a geometric center of the head and an apparent size of the head in a ideal direction of movement in a respective current scenario image;
   defining current lines of sight of the image acquisition unit as a vector, from a defined position of the image acquisition unit to a respective current position of the geometric center of the head;

calculating respective current angles between the ideal direction of movement of the head and the current lines of sight of the image acquisition unit;

storing the respective current values for angles and the apparent size of the head in a storage unit; and using the apparent size of the head stored in the storage unit at which an absolute sum of a difference between the respective current angle values and 90° was minimal to be an actual size of the head.

17. The method according to claim 16, which further comprises using a 3D camera as the image acquisition unit, the 3D camera operating according to a method selected from the group consisting of a stereoscopic method, a pencil of light method, and a time of flight method.

18. The method according to claim 16, which further comprises basing the defined position of the image acquisition unit on a center of a lens aperture of the image acquisition unit.

19. The method according to claim 18, which further comprises using a stereo camera as the image acquisition unit and basing the defined position on a center of a left lens aperture of the stereo camera.

20. The method according to claim 16, which further comprises recording continuously, via the image acquisition unit, images of a relevant scenario, at least 25 images per second.

21. The method according to claim 16, which further comprises dimensioning a size of the storage unit such that at least all measured values of a slow head movement from a first head position to a second head position can be stored.

22. The method according to claim 16, which further comprises using a ring buffer store as the storage unit, the ring buffer store being first filled and from then on an oldest value is always replaced by a current value.

23. The method according to claim 16, which further comprises filtering recordings of a head movement by filters and/or movement models.

24. The method according to claim 16, which further comprises combining different views of the occupant for forming a 3D overall view of the occupant.

25. The method according to claim 24, which further comprises:
simulating a front of the occupant for the 3D overall view; and
calculating a distance between the automatic dynamic disabling zone or the airbag module and the front of the occupant.

26. The method according to claim 16, which further comprises recording continuously, via the image acquisition unit, images of a relevant scenario, at least 30 images per second.

27. The method according to claim 16, which further comprises recording continuously, via the image acquisition unit, images of a relevant scenario, at least 35 images per second.

28. The method according to claim 25, which further comprises simulating a facial profile of the occupant.

29. A method for determining a current position of a head of an occupant in a passenger compartment of a motor vehicle, the head moving toward an automatic dynamic disabling zone in front of an airbag module, which comprises the steps of:
providing an image acquisition unit having an ideal line of sight being substantially perpendicular to an ideal direction of movement of the occupant;
recording an image scenario in the passenger compartment of the motor vehicle containing the occupant at least cyclically with the image acquisition unit and image information relating to the occupant being detected;
determining both a position of a geometric center of the head and an apparent size of the head in a ideal direction of movement in a respective current scenario image;
defining current lines of sight of the image acquisition unit as a vector, from a defined position of the image acquisition unit to a respective current position of the geometric center of the head;
calculating respective current angles between current actual movement vectors of the head and the current lines of sight of the image acquisition unit;
storing the respective current values for angles and the apparent size of the head in a storage unit; and
using the apparent size of the head stored in the storage unit at which an absolute sum of a difference between the respective current angle values and 90° was minimal to be an actual size of the head.

30. The method according to claim 29, which further comprises:
storing a respective last value for the position of the geometric center of the head; and
calculating a respective current movement vector from the stored last and current 3-dimensional positions of the head.

31. A device for determining a current position of a head of an occupant in a passenger compartment of a motor vehicle, the head moving toward an automatic dynamic disabling zone in front of an airbag module, the device comprising:
an image acquisition unit having an ideal line of sight being substantially perpendicular to an ideal direction of movement of the occupant, said image acquisition unit programmed to:
record an image scenario in the passenger compartment of the motor vehicle containing the occupant at least cyclically with the image acquisition unit and image information relating to the occupant being detected;
determine both a position of a geometric center of the head and an apparent size of the head in the ideal direction of movement in a respective current scenario image;
define current lines of sight of the image acquisition unit as a vector, from a defined position of the image acquisition unit to a respective current position of the geometric center of the head;
calculate respective current angles values between the ideal line of sight and the current lines of sight of the image acquisition unit;
store the respective current angles values and the apparent size of the head in a storage unit; and
use the apparent size of the head stored in the storage unit at which an absolute sum of a difference between the respective current angle values and 0° was minimal to be an actual size of the head.

32. A device for determining a current position of a head of an occupant in a passenger compartment of a motor vehicle, the head moving toward an automatic dynamic disabling zone in front of an airbag module, the device comprising:
an image acquisition unit having an ideal line of sight being substantially perpendicular to an ideal direction of movement of the occupant, said image acquisition unit programmed to:

record an image scenario in the passenger compartment of the motor vehicle containing the occupant at least cyclically with the image acquisition unit and image information relating to the occupant being detected;

determine both a position of a geometric center of the head and an apparent size of the head in a ideal direction of movement in a respective current scenario image;

define current lines of sight of the image acquisition unit as a vector, from a defined position of the image acquisition unit to a respective current position of the geometric center of the head;

calculate respective current angles between the ideal direction of movement of the head and the current lines of sight of the image acquisition unit;

store the respective current values for angles and the apparent size of the head in a storage unit; and use the apparent size of the head stored in the storage unit at which an absolute sum of a difference between the respective current angle values and 90° was minimal to be an actual size of the head.

* * * * *